Oct. 20, 1931. G. W. TROBRIDGE ET AL 1,828,481
METHOD OF MAKING ARTICLES FROM ORGANIC DISPERSIONS
Filed May 26, 1930
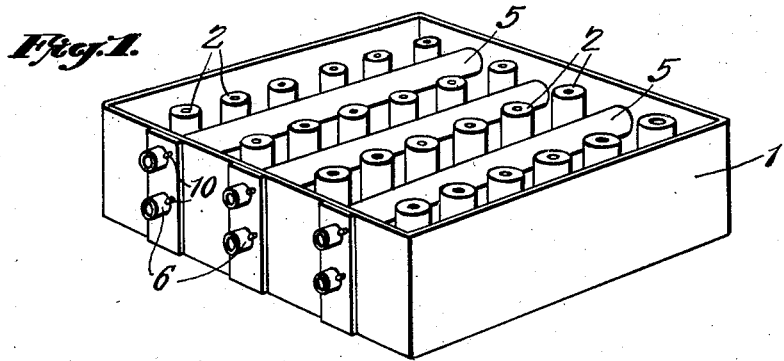
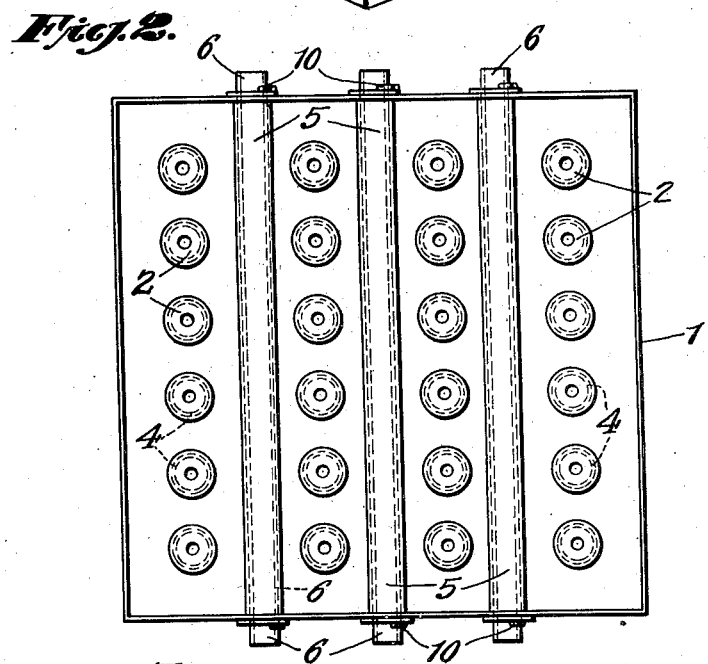
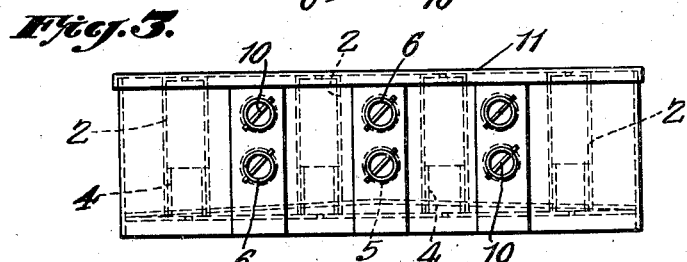
Inventors
GEOFFRY WILLIAM TROBRIDGE.
EDWARD ARTHUR MURPHY.
DOUGLAS FRANK TWISS.
WALTER GEORGE GORHAM.
By their Attorneys Patented Oct. 20, 1931

1,828,481

UNITED STATES PATENT OFFICE

GEOFFREY WILLIAM TROBRIDGE, OF SUTTON COLDFIELD, EDWARD ARTHUR MURPHY, OF ERDINGTON, BIRMINGHAM, DOUGLAS FRANK TWISS, OF WYLDE GREEN, WALTER GEORGE GORHAM, OF ERDINGTON, BIRMINGHAM, ENGLAND, ASSIGNORS TO DUNLOP RUBBER COMPANY LIMITED, OF BIRMINGHAM, ENGLAND, A BRITISH COMPANY

METHOD OF MAKING ARTICLES FROM ORGANIC DISPERSIONS

Application filed May 26, 1930, Serial No. 455,694, and in Great Britain May 28, 1929.

Our present invention relates to a method of making sponge articles directly from aqueous dispersions of organic materials, and particularly rubber and rubber like materials.

When a mass of unvulcanized sponge material has been formed, the particles of air entrapped or enclosed in the sponge act as a heat insulator and, therefore, prevent or impede the penetration of the heat of vulcanization into the interior of the mass and thus prevent a uniform heat and vulcanization. Sponge rubber articles of considerable size such as cushions, mattresses, etc., have, therefore, usually been assembled from substantially laminar units of such limited thickness as to permit adequate transfer of heat from the sides of the units.

An object of the present invention is to provide a method and apparatus whereby an article or mass of sponge rubber of any desired size may be made directly in an integral unitary mass.

Another object of the invention is to provide a mold having heating elements projecting into the interior of the mold and of such cross section that they may be withdrawn without displacing any of the interior volume of said mold.

With these and other objects in view which will more fully appear from the following description, the invention comprises the method of treatment and the mold described in the following specification.

The various features of the invention are illustrated in the accompanying drawings, in which—

Fig. 1 is a perspective view of a mold embodying a preferred form of the invention, the top or upper side of the mold being removed to show the interior.

Fig. 2 is a plan view of the mold shown in Fig. 1, with the top removed, and

Fig. 3 is an elevation of the mold.

In our invention aqueous dispersions of rubber materials are introduced into the molds preferably of internal dimensions substantially equal to the respective external dimensions of the articles to be formed, and provided with holes in which may be fitted devices extending into or through the interior of the molds and of substantially uniform cross section, or of a cross section decreasing or varying in a uniform manner so that it may be withdrawn from the interior of the mold without distorting or displacing any of the rubber material contained therein.

The molds may be of any suitable type and may be assembled from standard units so as to be of the dimensions approximating those of the articles it is desired to produce. The heating means for heating the interior of the mold may consist of any suitable heating means, as for example, electric heating means or tubes open at one or both ends to receive the heating medium and transmit heat from the heating medium in which the mold is immersed into the interior of the mold.

The emulsions or dispersions of rubber material to which the invention may be applied may consist or comprise rubber, gutta percha, balata or similar vegetable resins occurring naturally or obtained artificially, or of emulsions or suspensions of artificial or synthetic resins or gums. Aqueous dispersions of coagulated rubber, of vulcanized rubber, synthetic rubber, waste or reclaim may be employed as desired either as alternatives to or as admixtures in the rubber materials of the above type. The dispersions may contain the usual compounding and vulcanizing ingredients. A concentrate of a rubber or latex prepared, for example, by stabilizing the latex with a colloid, such as a soap and ammonia, and then concentrated or evaporated with agitation, as described in application Serial No. 232,705 may be employed. Such concentrate may contain any one or more of the usual compounding ingredients, preferably excepting those which would tend to form insoluble soaps or to increase the surface tension of the mixture. The aqueous emulsions or dispersions may, if desired, be such as are, or can be rendered, capable of gelling upon the application of heat or upon the addition of substances to cause the emulsions or dispersions to gel in the cold after a definite and controllable time interval.

The sponge like structure may be produced in any known manner in the material subsequent to its solidification or, alternatively, the emulsions or dispersions aforesaid can be first converted into a froth by means of a gas and the froth thereafter converted into a permanent spongy structure of irreversible solid material.

After the perforated sponge article has gelled or set and, if desired, the coagulated material vulcanized, it may be removed from the mold without permanent distortion by sliding out of the mold the heating devices except those whose axes are substantially parallel to the direction in which the articles are to be removed. A side or end of the mold normal to the direction in which the article is to be removed may then be removed and the articles pushed or slid out of the mold. All of the heating elements may, if desired, be removed before removing the article.

The following example illustrates the process:

A latex having the following composition is prepared and concentrated as described in applications Serial No. 232,705 and Serial No. 316,722 in which the latex is kept in constant movement and concentrated without coagulation:

| | Parts by weight |
|---|---|
| Rubber | 100 |
| Sulphur | 3 |
| Zinc diethyldithiocarbamate | 0.7 |
| Mineral oil | 5.0 |
| Caustic potash | 0.4 |
| Casein | 0.1 |
| Oleic acid | 0.5 |

The above ingredients are in the form of a latex cream sufficiently viscous and concentrated to prevent the segregation of the compounding ingredients. 2 parts by weight of sodium silicofluoride based on the dry mixing are added and the mass is then whipped for a few minutes by wire mesh paddles or suitable stirrers or whipping machines, thereby converting the mass into a frothy condition. 0.5 parts of zinc oxide are then added as a dispersion, preferably being dispersed with casein. The froth thus obtained is then placed in a metal mold provided with heating elements of the type indicated above, and permitted to gel at normal atmospheric temperature (16° C.) or (50 or 60° C.). The gelling will occur in about 30 minutes. The mold is then placed in an autoclave and vulcanization carried out for one hour with steam at a pressure of five pounds. If hollow internal heating tubes are employed, the access of steam to the interior of the tubes will heat and vulcanize the mass within the mold substantially uniformly throughout. The molded material may then be removed from the mold and dried by known means.

In the accompanying drawings a metallic mold 1 for vulcanizing a mass of material having dimensions of 16″×16″×5″ is shown. The mold 1 is provided with a removable lid or cover and with four rows of six vertical heating tubes 2, and with three rows of two horizontal tubes 3. All of the tubes 2 extend in parallel relation from top to bottom of the mold and are of uniform cross section so that the rubber article formed in the mold may be removed lengthwise of these tubes without distortion. The heating tubes 3 also extend in parallel relation from one end or side of the mold to the other and are of uniform cross section so that they may be withdrawn through the mold without disturbing any part of the surrounding molded material.

The heating tubes 2 preferably consist of loose tubes fitting vertically over tubes fixed into the bottom of the mold. The heating tubes or devices 3 preferably consist of thin outer tubes 5 substantially equal in length to the inside length of the mold and fitting loosely over inner tubes 6. The tubes 3 project through the walls of the mold and are held in position in the mold by means of cotter pins 10 in the projecting parts adjacent the outer surface of the mold. The thin outer tubes 5 of the heating elements 3 may be made of metal and may be withdrawn from the mold or, they may be of rubber and may remain in the article, the inner devices 3 only being withdrawn. The tubes 5 are fitted into the mold 1 prior to the insertion of the inner heating tubes 6. The tubes 6 are open at both ends so that the heating material within the autoclave and surrounding the mold may enter the tubes 6 and circulate therethrough to rapidly carry the heat into the interior of the mold.

After the material within the mold has gelled and set and, if desired, has been vulcanized, the perforated sponge article thus produced is removed from the mold without permanent distortion by removing the cotter pins 10 and sliding the tubes 6 out of the mold. The tubes 2, the main axes of which are substantially parallel to the direction of removal of the article, may remain in the mold until after the removal of the article, if desired.

The heating tubes 2 are illustrated as formed of loose vertical tubes fitting over tubes 4 fixed into the bottom of the mold. The tubes 4 are provided with an open end 8 fitted into the bottom of the mold 1 to enable steam or other heating fluid to enter the tubes 2 and thus reach that part of the interior of the mold and of the material contained therein and lying between the heating tubes 5. When the mold is filled with material and prior to its insertion into the autoclave, the open or top side is closed by means of a cover 11.

It will be understood that the dimensions of the mold may be increased or decreased, as desired, and that the number or size of the internal heating elements may be increased or decreased proportionately.

In order to afford additional support to the sponge material during the setting and vulcanizing operations, reinforcements, as for example, layers of woven fabric, may be provided within the material in the mold and attached or placed relative to said heating devices. Such supporting reinforcements may remain after vulcanization and may serve as reinforcing components of the finished articles.

What we claim is—

1. A method of making sponge articles in an integral mass which comprises molding a froth of a dispersion of rubber material to the desired dimensions, heating said molded mass from the exterior, and conveying heat into the interior of said mass in closely spaced parallel paths.

2. A method of making sponge articles in an integral mass which comprises molding a froth of a dispersion of rubber material to the desired dimensions, heating said molded mass from the exterior, and conveying heat into the interior of said mass in closely spaced parallel paths of uniform cross section.

3. A process of making sponge articles in an integral mass which comprises molding a froth of rubber material to the desired dimensions, surrounding said molded mass with a heating fluid, and conveying said heating fluid into the interior of said mass in closely spaced parallel paths.

4. A process of making sponge articles in an integral mass which comprises molding a froth of rubber material to the desired dimensions, surrounding said molded mass with a heating fluid, and conveying said heating fluid into the interior of said mass in closely spaced parallel paths of uniform cross section.

5. A process of forming integral molded masses of sponge structure which comprises forming a concentrated vulcanizable rubber material into a froth, forming said froth to the required dimensions, enclosing said masses in a heating fluid at a vulcanizable temperature, and conveying said heating fluid through said masses in closely spaced parallel paths.

6. A method of forming an integral mass of sponge like structure which comprises forming a concentrated vulcanizable dispersion of rubber material into a froth, forming said froth to a mass of the required dimensions, surrounding said mass with a heating fluid at a vulcanizing temperature, and conveying said heating fluid through said mass in parallel paths, said paths being in two or more directions and of substantially uniform cross section.

7. The method of claim 1 in which a layer of reinforcement is embedded in said mass prior to vulcanization.

8. The method of claim 7 in which a woven fabric is used as a reinforcing means.

9. The method of making sponge articles in an integral mass which comprises molding a froth of a dispersion of rubber material to the desired dimensions and heating said froth interiorly in spaced channels.

In witness whereof we have hereunto set our hands.

GEOFFREY WILLIAM TROBRIDGE.
EDWARD ARTHUR MURPHY.
DOUGLAS FRANK TWISS.
WALTER GEORGE GORHAM.